United States Patent [19]

Orita

[11] 4,338,638
[45] Jul. 6, 1982

[54] TAPE RECORDER

[75] Inventor: Shunichi Orita, Hachioji, Japan

[73] Assignee: Olympus Optical Co., Ltd., Tokyo, Japan

[21] Appl. No.: 101,255

[22] Filed: Dec. 7, 1979

[30] Foreign Application Priority Data

Dec. 27, 1978 [JP] Japan ............................ 53-180331[U]

[51] Int. Cl.³ .............................................. G11B 15/04
[52] U.S. Cl. ......................................... 360/60; 360/61
[58] Field of Search ....................... 360/62, 61, 60, 67, 360/68

[56] References Cited

U.S. PATENT DOCUMENTS

| | | | |
|---|---|---|---|
| 3,705,272 | 12/1972 | Tsuji et al. | 360/62 |
| 3,721,774 | 3/1973 | Yonemoto et al. | 360/61 |
| 3,843,573 | 10/1974 | Kosaka | 360/67 |
| 3,937,902 | 2/1976 | Dorren | 360/61 |
| 3,952,330 | 4/1976 | Rimkus et al. | 360/61 |
| 3,959,817 | 5/1976 | Horjo et al. | 360/67 |
| 3,968,519 | 7/1976 | Yoneya et al. | 360/62 |
| 4,004,293 | 1/1977 | Osburn | 360/67 |
| 4,070,106 | 1/1978 | Saito | 360/62 |
| 4,086,635 | 4/1978 | Sairou | 360/62 |

Primary Examiner—Vincent P. Canney

[57] ABSTRACT

A switch set in the power supply section of a microphone is actuated at the initial stage of the slide of an operation button which is carried out to shift a tape recorder operation from the recording mode to the stop mode. The switch is actuated at the terminal stage of the slide of the operation button which is carried out to changeover the tape recorder operation from the stop mode to the recording mode. Therefore it is possible to eliminate the unnecessary recording in the built-in microphone of noises disagreeable to the ear of the user which are caused by, for example, the slide of the operation button.

2 Claims, 4 Drawing Figures

TAPE RECORDER

BACKGROUND OF THE INVENTION

This invention relates to a tape recorder containing a microphone. Where, with a tape recorder containing a microphone, the operation button is actuated to shift the tape recorder operation from the recording mode to the stop mode or vice versa, there is the possibility that sounds resulting from the actuation of, for example, an operation lever are recorded in a built-in microphone, giving rise to noises very disagreeable to the ear of the user. However, the known tape recorder of the abovementioned type lacks a simple mechanism effective to suppress the unnecessary recording of noises caused by the slide of, for example, the operation button.

SUMMARY OF THE INVENTION

It is therefore an object of this invention to provide a tape recorder which can prevent as much as possible the unnecessary recording of noises arising from, for example, the slide of an operation button which is carried out to shift the tape recorder operation from the recording mode to the stop mode or vice versa.

To this end, the present invention provides a tape recorder, wherein a switch set in the power supply section of a microphone is actuated at the initial stage of the movement of the operation button which is carried out to shift the tape recorder operation from the recording mode to the stop mode, and at the terminal stage of the movement of the operation button which is carried out to change over the tape recorder operation from the stop mode to the recording mode, thereby eliminating the unnecessary recording in the built-in microphone of noises disagreeable to the ear of the user which are caused by, for example, the slide of the operation button.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
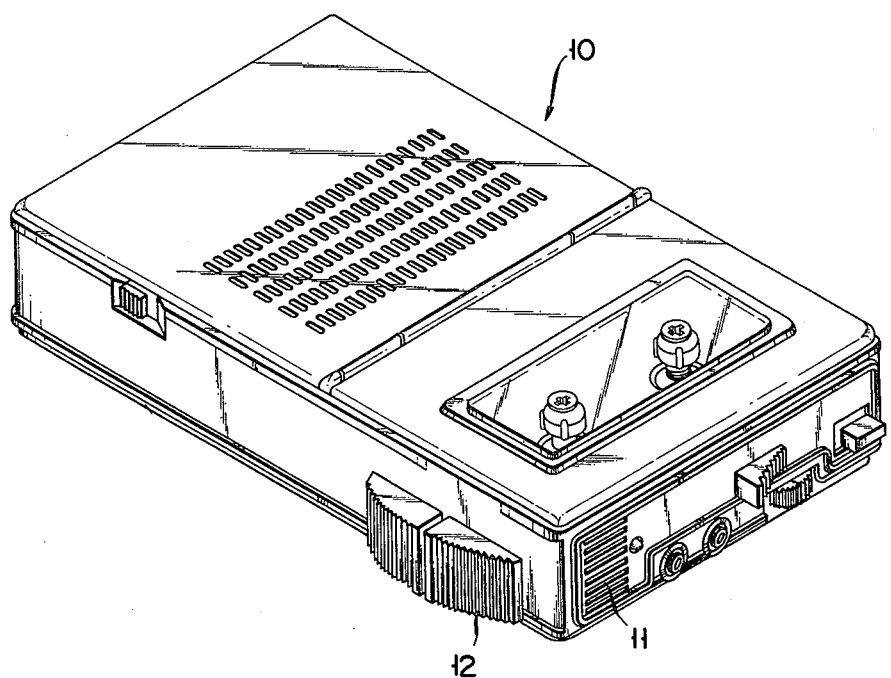
FIG. 1 is a schematic perspective view of a tape recorder according to this invention.

There will now be described by reference to the accompanying drawing a tape recorder embodying this invention. As seen from FIG. 1, a microphone is received at the back of a plurality of slits 11 formed on the upper surface of the tape recorder 10. The built-in microphone is connected to an electric circuit shown, for example, in FIG. 2.

Figure 2:
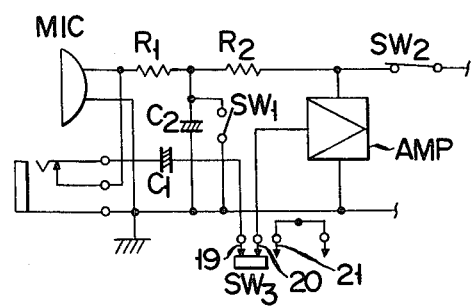
FIGS. 2 and 3 show separate embodiments of the invention and are the electric circuit diagrams of a switch built-in the tape recorder of FIG. 1.

Referring to FIG. 2, R1, R2 denote resistors; C1, C2 condensers; SW1 a switch for a built-in microphone (MIC); SW2 a main switch for the entire electric circuit; and SW3 a recording-reproduction switch. The recording-reproduction switch SW3 has contacts 19, 20 connected together for the recording mode. The contacts 20, 21 are connected together for the reproduction mode. A reproducing circuit (known in the art and not shown) is connected to terminal 21.

The microphone switch SW1 is rendered conducting when the indicated recording mode is changed to the stop mode, then the charge of the condenser C2 is released to suspend power supply to the built-in microphone. Later, the main switch SW2 is rendered nonconducting. With a tape recorder 10 arranged as described above, sounds arising from, for example, the slide of an operation button to shift the tape recorder operation from the recording mode to the stop mode are only recorded in the built-in microphone for an extremely short length of time, because the built-in microphone is electrically cut off at the initial stage of the movement of the operation button, thereby effectively reducing the occurrence of noises disagreeable to the ear of the user.

Figure 3:
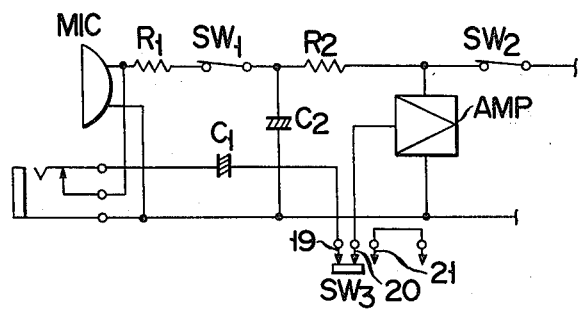

FIG. 3 shows the circuit which causes the microphone switch SW1 to be put into operation at the recording mode. When the switch SW1 is rendered nonconducting, then the built-in microphone is electrically cut off. Later, the main switch SW2 becomes inoperative. Conversely when the operation button so slides as to effect the shifting of the tape recorder operation from the stop mode to the recording mode, then the microphone switch SW1 is rendered nonconducting (FIG. 2) or conducting (FIG. 3) at the terminal stage of the slide of the operation button in FIGS. 2 and 3, thereby allowing for power supply to the built-in microphone.

Figure 4:
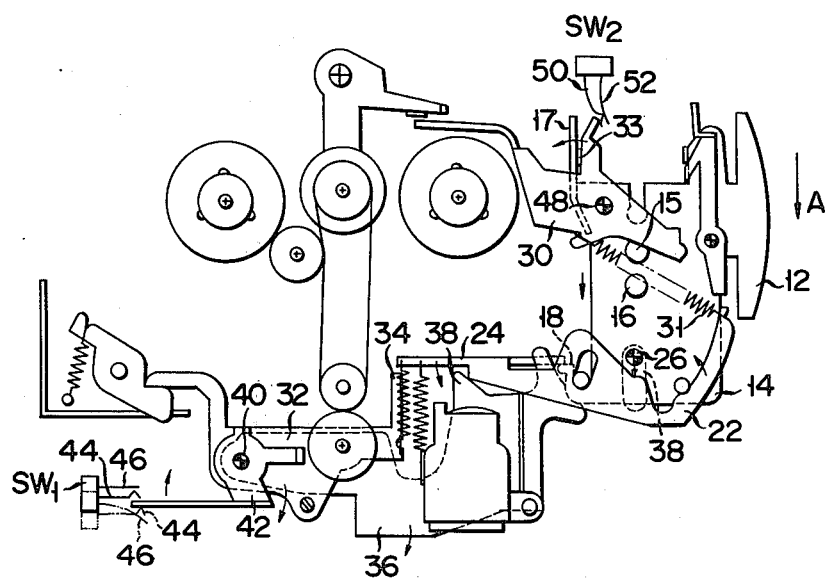
FIG. 4 is a schematic top plan view of the main part of the tape recorder of FIG. 1.

FIG. 4 is a schematic top plan view of the main part of a tape recorder 10 provided with the microphone switch SW1 and main switch SW2. FIG. 4 shows the arrangement of a tape recorder 10 set for the recording mode. When the operation button 12 and operation board 14 integrally formed therewith are made to slide in the direction of an arrow A indicated in FIG. 4 to cause a steel ball 16 to be engaged with a hole 15 formed in the operation board 14, then the indicated recording mode can be changed to the stop mode. When the operation button 12 slides, a hook 18 of the operation board 14 jointly slides to disengage the hook 18 from a downward bent attachment 24 of a seesaw lever 22 to set free the bent attachment 24. At this time, the depression pin 26 of the operation board 14 slides through an elongate hole 28 of a chassis to abut against the seesaw lever 22. This seesaw lever 22 is rotated counterclockwise about the pin 26 by the urging force of a tension spring 31. For better understanding of the drawing, a pin acting as the center of rotation is marked with the symbol ⊚.

When the seesaw lever 22 is rotated counterclockwise, then the downward bent attachment 24 of the seesaw lever 22 is pressed against a projection attachment 34 of a pinch roller support board 32 and a projecting attachment 38 of a magnetic head support board 36, causing the pinch roller support board 32 and magnetic head support board 36 to be rotated clockwise about a pivotal pin 40. A switch-actuating board 42 is fixed to the pinch roller support board 32. The switch-actuating board 42 and pinch roller support board 32 are jointly rotated clockwise about the pivotal pin 40. The microphone switch SW1 which is rendered nonconducting, at the recording mode and put into operation, at the stop mode is mounted on the chassis. The switch-actuating board 42, when rotated clockwise, abuts against a movable contact 44 of the microphone switch SW1, causing the movable contact 44 to be connected to a fixed contact 46. As a result, the microphone switch SW1 is rendered conducting.

The downward bent attachment 24 of the seesaw lever 22 is released from the hook 18 to be set free when the operation button 12 or the operation board 14 slides in the direction of arrow A. As a result, the attachment 24 is rotated by the urging force of the spring 31. The switch-actuating board 42 puts the microphone switch SW1 into operation at the initial stage of the slide of the operation button 12. Obviously, the switch-actuating board 42 may be fitted to the magnetic head support board 36, instead of the pinch roller support board 32.

At the recording mode shown in FIG. 4, a projecting attachment 17 of the operation board 14 integrally formed with the operation button 12 is engaged with a downward bent attachment 33 of a brake lever 30, causing this brake lever 30 to be rotated clockwise about the pivotal pin 48. As a result, the brake lever 30 is prevented from being pressed against a reel. When the operation button 12 is made to slide in the direction of the arrow A for the stop mode, then the operation board 14 and projecting attachment 17 slide to be disengaged from each other. Accordingly, the brake lever 30 is rotated counterclockwise about the pivotal pin 48. The main switch SW2 which is rendered conducting at the recording mode and nonconducting at the stop mode is set close to the brake lever 30. At the recording mode, a movable contact 50 of the main switch SW2 abuts against the brake lever 30 to be connected to a fixed contact 52 of the main switch SW2. When the projecting attachment 17 of the operation board 14 is shifted, then the brake lever 30 is rotated counterclockwise about the pivotal pin 48 by urging force of the spring 31. Therefore, the movable contact 50 is elastically removed from the fixed contact 52 to render the main switch SW2 non-conducting. In this case, it is necessary that first the microphone switch SW1 and then the main switch SW2 be put into operation. This arrangement can be easily effected, for example, by the process of releasing engagement between the hook 18 and the downward bent attachment 24 in advance of engagement between the projecting attachment 17 and brake lever 30, or by the proper relative positions of the microphone switch SW1 and main switch SW2.

When the tape recorder operation is changed over from the stop mode to the recording mode, then the main switch SW2 is first actuated, and then the microphone switch SW1 is put into operation at the terminal stage of the slide of the operation button 12.

The microphone switch SW1 shown in FIG. 3 is operated in such a manner that as shown in imaginary lines in FIG. 4, the movable contact 44 is pressed against the fixed contact 46 at the recording mode by means of the switch-actuating attachment 42 and is elastically removed from the fixed contact 46 at the stop mode.

With a tape recorder embodying this invention, the power supply section of a built-in microphone is provided with a switch SW1. This microphone switch SW1 is actuated at the initial stage of the movement of the operation button 12 which is carried out to shift the tape recorder operation from the recording mode to the stop mode. The microphone switch SW1 is actuated at the initial stage of the movement of the operation button to render the built-in microphone nonconducting. Therefore, sounds arising from, for example, the movement of the operation button are recorded in the microphone only for an extremely short length of time, thereby effectively reducing the occurrence of noises disagreeable to the ear of the user and preventing the recording of such noises. When the operation button is made to slide to change the tape recorder operation from the stop mode to the recording mode, then the microphone switch SW1 is actuated at the terminal stage of the movement of the operation button to render the microphone conducting. Therefore, sounds caused by, for example, the slide of the operation button 12 are recorded in the microphone only for an extremely short length of time. With the tape recorder of this invention, a switch SW1 provided in the power supply section of a built-in microphone is actuated only with the movement of the operation button. Therefore, the present tape recorder is very much simplified in arrangement.

What is claimed is:

1. A tape recorder comprising:
   a built-in microphone;
   a power supply circuit for said microphone, a power supply switch in said power supply circuit;
   a microphone disabling switch provided in said circuit for disabling said microphone;
   an operation button;
   connecting means including microphone disabling switch actuating means operably connected to said operation button to actuate said microphone disabling switch at an initial state of movement of the operation button when said operation button is moved to change the operation mode of the tape recorder from a recording mode to a stop mode thereby rendering the disabling switch operative to disable the microphone during initial operation button movement;
   said connecting means further including power supply switch actuating means operably connected to said operation button to actuate said power switch when the operation button is moved to change the operation mode from the stop mode to the recording mode, thereby, actuating the power supply switch to effect power supply to the microphone, said connecting means further including delay means preventing deactuation of said power supply switch until after said microphone disabling switch has been actuated by said microphone switch actuating means, said delay means preventing deactuation of said power supply switch until the operation button has reached a terminal state of movement thereof, said delay means further including means for delaying deactuation of said microphone disabling switch until the operation button has reached a terminal state of movement thereof during a change in operation mode of the tape recorder from a stop mode to a recording mode, both said power supply switch and said microphone disabling switch being in operation at the same time between said initial and terminal states of movement of said operation button so that said microphone is always disabled during movement of the operation button between said initial and terminal states of movement thereof; and
   means in said connecting means for maintaining said microphone disabling switch actuated whenever said power supply switch is deactuated, thereby maintaining said microphone disabled whenever power to the microphone is shut off by the operation button.

2. A tape recorder according to any one of claims 1, wherein said connecting means has a switch actuating board mounted on a pinch roller support board rotatable with the movement of the operation button.

* * * * *